United States Patent [19]

Sanin et al.

[11] 4,291,718

[45] Sep. 29, 1981

[54] PRESSURE VALVE

[76] Inventors: Sergei A. Sanin, Oktyabrsky prospekt, 405, korpus 3, kv. 107; Jury F. Ponomarenko, poselok VUGI, 10, kv. 33, both of Ljubertsy Moskovskoi oblasti; Vladislav D. Firstov, ulitsa Shvernika, 22, kv. 25; Vladimir N. Khorin, Fakultetsky pereulok, 3, kv. 206, both of Moscow; Arnold M. Ragutsky, ulitsa Sakko i Vantseti, 5, kv. 4, Malakhovka Moskovskoi oblasti; Boris N. Kostjunin, Teply Stan, 1 mikroraion, korpus 7, kv. 398, Moscow; Petr M. Bronfen, ulitsa Nurkena Aelirova, 37, korpus 2, kv. 20., Karaganda, all of U.S.S.R.

[21] Appl. No.: 15,172

[22] Filed: Feb. 26, 1979

[51] Int. Cl.[3] ........................ F15B 11/18; G05D 11/00

[52] U.S. Cl. ........................................ 137/87; 91/420; 251/62; 251/63; 251/63.6

[58] Field of Search ...................... 91/420; 251/62, 63, 251/63.5, 63.6; 137/87

[56] References Cited

U.S. PATENT DOCUMENTS

| | | | |
|---|---|---|---|
| 952,605 | 3/1910 | Connors et al. | 251/63 |
| 2,653,626 | 9/1953 | Finlayson | 91/420 |
| 3,015,316 | 1/1962 | Thomas | 91/420 |
| 3,033,168 | 5/1962 | Ruhl | 91/420 |
| 3,749,112 | 7/1973 | Nishikawa et al. | 91/420 |
| 3,795,255 | 3/1974 | Malott et al. | 91/420 |
| 3,906,991 | 9/1975 | Häussler | 91/420 |
| 4,018,136 | 4/1977 | Kaetterhenry | 91/420 |
| 4,076,210 | 2/1978 | Spielvogel | 251/63.5 |

FOREIGN PATENT DOCUMENTS

| | | | |
|---|---|---|---|
| 2536106 | 2/1977 | Fed. Rep. of Germany | 91/420 |
| 1188022 | 4/1970 | United Kingdom . | |
| 412406 | 1/1974 | U.S.S.R. | 91/420 |
| 513171 | 5/1976 | U.S.S.R. . | |

OTHER PUBLICATIONS

V. V. Vavilov and T. E. Ladokhina, "Hydraulic Actuators of Powered Mine Roof Supports and their Developments"-Moscow, Russia, 197i, p. 15.

*Primary Examiner*—Martin P. Schwadron
*Assistant Examiner*—G. L. Walton
*Attorney, Agent, or Firm*—Lackenbach, Lilling & Siegel

[57] ABSTRACT

The pressure valve is actuated by pressurized fluid and has a housing with a high-pressure space and a low-pressure space separated from each other by a partition. The partition has a bore accommodating a valve member. Axial passages are made in the body of the valve member for establishing alternating communication between the spaces upon the displacement of the valve member. The low-pressure space receives a pressure-relief valve spring-urged away from the partition and movable by the action of pressure selectively supplied to initiate relieving of the high-pressure space. The pressure-relief piston has an axial bore. The pressure valve incorporates an auxiliary piston in the axial bore of the pressure-relief piston and it cooperates with the valve member to displace the latter. The body of the valve member is provided with throttling passages communicating with the axial passages. The flow passage area of the throttling passages is substantially smaller than that of the axial passages, and the throttling passages are arranged so that during the high-pressure space pressure-relieving operation, the two spaces communicate via the throttling passages until the effort applied to the valve member by the auxiliary piston overcomes the effort applied to this valve member from the high-pressure chamber.

5 Claims, 6 Drawing Figures

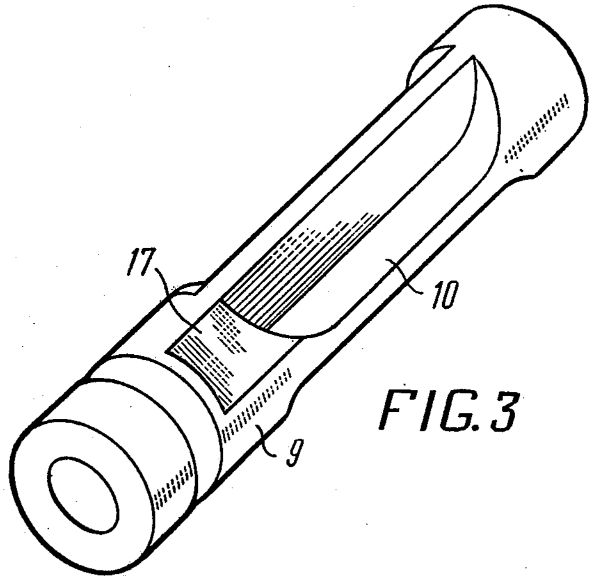
FIG. 3
FIG. 4
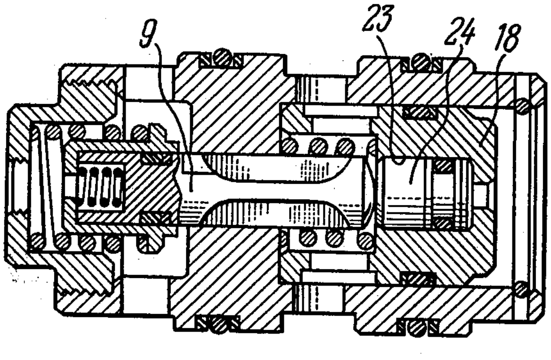

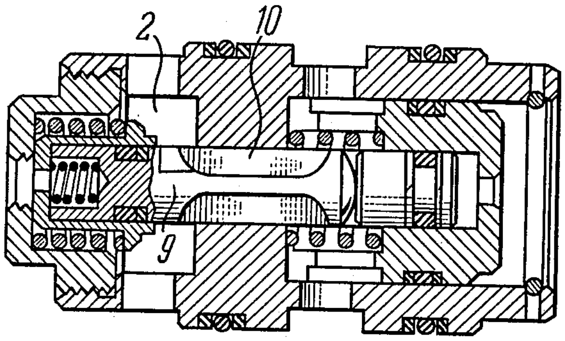
FIG. 5
FIG. 6
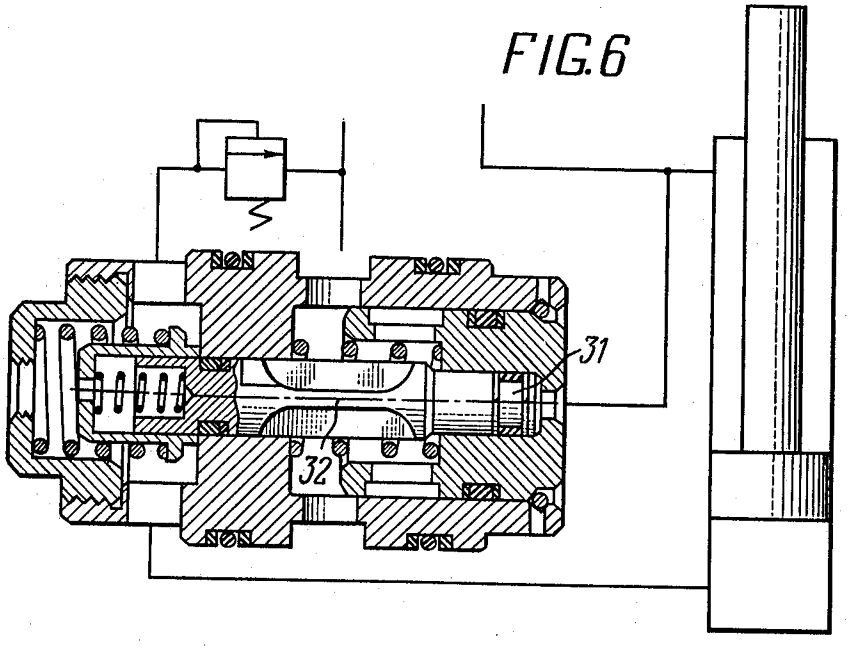

PRESSURE VALVE

BACKGROUND OF THE INVENTION

The present invention relates to high-pressure hydraulic drives and actuators, and, more particularly, it relates to pressure valves.

The present invention can be used to utmost effectiveness in the hydraulic circuitry of powered mine roof supports, e.g. as the hydraulic lock of a hydro-operated mine roof support prop.

However, the invention can be utilized in various other industries and technologies, wherever a pressurized fluid is to be reliably sealed in a space or spaces of a mechanism, with subsequent gradual relieving of this pressure.

The invention is capable of being incorporated both in hydraulic systems and in pressurized-gas ones, e.g. pneumatic systems.

At present, there is known a variety of structures of pressure valves, sometimes also called hydraulic fluid locks, employed to control various elements of fluid systems.

Thus, there is known a hydraulic lock disclosed in the GB Pat. No. 1,188,022, comprising a housing with passages, the counterbore of this housing accommodating therein a spring-urged pressure-relief piston and a valve seat engageable by a closure member having a tapering surface. There is also incorporated a stepped-diameter sleeve biased by a spring relative to the housing of the hydraulic lock and having a throttling opening or orifice. The closure member is biased by a spring from the stepped-diameter sleeve and has its opposite end engaged by the end face of the pressure-relief piston.

In the normal position, the closure member and the stepped-diameter sleeve are urged against the seat by the efforts of the spring and of the pressure of the working fluid in the vessel or volume where the hydraulic lock is mounted, which prevents leaking of this fluid.

With the vessel or volume being filled, the working fluid in the supply passage or duct acts upon the closure member and displaces it jointly with the stepped-diameter sleeve, whereby a fluid passage is defined between the closure member and the seat.

To relieve the vessel or volume from the pressure, the working fluid is fed to the end face of the pressure-relief piston, whereby in its motion the pressure-relief piston acts upon the closure member, pulling it along, and so the working fluid starts flowing to drain via the throttling opening in the stepped-diameter sleeve which is in the meantime urged by the pressure and by the spring against the seat, and via the clearance formed between the closure member and the seat, so that the pressure is gradually reduced.

With the pressure having been reduced to a level when the pressure-relief piston is capable of moving or rising still further and of displacing the stepped-diameter sleeve, thus increasing the flow passage area between the closure member and the seat, the pressure-relieving action is intensified.

However, the hydraulic lock of the abovedescribed structure is both complicated and inadequately reliable in its performance. The major cause of failures of this hydraulic lock in operation has proved to be the clogging of the throttling opening, so that the pressure-relieving action becomes impossible.

There is further known a hydraulic lock (see the description of OMKTM Mine Roof Support in "Hydraulic Actuators of Powered Mine Roof Supports and Their Development Trends" by V. V. Vavilov, T. E. Ladokhina et al., in Russian, Moscow, 1971, p.15) comprising a housing with a high-pressure space and a low-pressure space separated by a partition with an axial opening or bore receiving therein a reciprocable longitudinal cylindrical valve member having a blind axial passage made in the body thereof, as well as radial openings via which the two spaces can be alternately in communication upon the displacement of the valve member; a pressure-relief piston biased by a spring is mounted in the low-pressure space and cooperates with the valve member, as the pressure-relief piston is displaced by the pressure of the liquid supplied to act upon the end face thereof, remote from the valve member. The valve member carries sealing means adapted to seal off the associated volume or vessel upon its having been filled with the working liquid from the supply source, and a sleeve biased by a spring protecting the sealing means from damage during the reciprocation of the valve member.

As the working liquid is supplied under pressure into the volume or vessel incorporating the hydraulic lock, the valve member is displaced by the action of this pressure. Upon the sealing means on the valve member having cleared the surface of the opening in the partition, the liquid flows into the high-pressure space via the blind axial passage and the radial openings.

To relieve the vessel or volume from the pressurized liquid, the working liquid is fed to act upon the end face of the pressure-relief piston, so that the latter's opposite end acts upon the valve and displaces it axially. Upon the sealing means on the valve member having cleared the lateral surface of the opening or bore in the partition, the high-pressure space communicates with the low-pressure space, whereby the pressure reduction and the relieving of the vessel or volume are commenced.

A major shortcoming of the last-described structure of a hydraulic lock is that when the vessel or volume is to be relieved from pressure, the hydraulic lock opens in a relatively short time, whereby hydraulic impact or shock takes place both in the low-pressure space and in the high-pressure space. This surging shock may result in the pressure being momentarily built up to a value which is three times as high as the initial pressure in the vessel or volume. The process is accompanied by oscillation of the valve member in the housing of the hydraulic lock at a frequency up to 120 Hz and velocity up to 1000 mm/sec. This results in intensive wear of the hydraulic lock and its relatively rapid failure.

There is further known a hydraulic lock which is currently widely used in powered mine roof supports for controlling the operation of hydraulic props (see the description of the EKOR Hydraulic Lock in "Hydraulic Actuators of Powered Mine Roof Supports and Their Development Trends" by V. V. Vavilov, T. E. Padokhina et al., in Russian, Moscow, 1971). The hydraulic lock comprises a housing with a high-pressure space and a low-pressure space. In the counterbores of the housing there are accommodated a pressure-relief valve biased by a spring and a plastic seat engageable by a closure member in the shape of a ball urged against the seat by an abutment biased by a spring. When the working liquid is fed into the hydraulic prop, the pressure of the supplied liquid drives the ball away from the seat, opening the path for the liquid into the prop.

To relieve the pressure, the working liquid is fed to the end face of the pressure-relief valve which is thus displaced and acts by its opposite end upon the ball, making the latter clear its seat, whereby the working liquid is drained from the hydraulic prop.

With the hydraulic lock having the last-described structure, a hydraulic shock likewise takes place, resulting in an increased pressure and an oscillation mode of the operation of the ball, the oscillation having a relatively high frequency, which results in accelerated wear of the components of the hydraulic lock, particularly, of the seat.

There is still further known a pressure valve employed for controlling the operation of the hydraulic props of powered mine roof supports (see, for instance, the SU Inventor's Certificate No. 513,171), comprising a housing with a high-pressure space and a low-pressure space. The two spaces are separated by a partition having a central opening or bore accommodating therein a movable cylindrical valve member with sealing means. Made in the body of the valve member are passages through which the spaces alternatingly communicate when the valve member is displaced.

A pressure-relief valve biased by a spring is mounted in the low-pressure space of the housing.

In the normal position of the valve, the sealing means carried by the valve member engage the lateral surface about the bore in the partition and seal away one space from the other space.

When the working liquid is to be fed into the under-piston space of the hydraulic prop to extend the latter, the working liquid is fed into the hydraulic lock, the pressure of the liquid displacing the valve member toward the high-pressure space, whereby the two spaces communicate, and the liquid flows through the valve into the under-piston space of the hydraulic prop. With the required pressure built up in the under-piston space of the hydraulic prop, the feeding of the liquid into the hydraulic lock is discontinued, whereby the action of the liquid pressure in the under-piston space and of the return springs restores the valve member to its normal position where it separates the high-pressure space from the low-pressure space and locks the liquid in the under-piston space of the hydraulic prop.

To relieve the hydraulic prop from the pressure, the working liquid is fed to the end face of the pressure-relief piston, opposite to the one cooperating with the valve member, whereby the pressure displaces the pressure-relief piston which moves the valve member, overcoming the action of the liquid pressure in the high-pressure space and of the return springs. Upon the sealing means having cleared the lateral surface of the bore in the partition, the two spaces communicate with each other, and the fluid under pressure is drained from the under-piston space of the prop through the hydraulic lock into the drain line, relieving the hydraulic prop.

The relieving of the hydraulic prop is effected in this case within a very short time, resulting in a hydraulic shock within the valve. This brings about unwanted oscillation of the valve member and of the relief piston at a relatively high frequency, which accelerates the wear of practically every major component of the hydraulic lock, thereby shortening the service life thereof.

SUMMARY OF THE INVENTION

It is the main object of the present invention to eliminate the abovementioned drawbacks of the aforesaid pressure valves or hydraulic locks.

It is another object of the present invention to enhance the reliability of the performance of a pressure valve.

It is still another object of the present invention to prolong the service life of a pressure valve.

These and other objects of the invention are attained in a pressure valve comprising a housing with low-pressure and high-pressure spaces communicating through openings in this housing with a pressurized fluid source and being separated from each other by a partition having an axial bore therethrough, accommodating a reciprocable cylindrical valve member having axial passages made in the body thereof for establishing alternating communication between the spaces upon the displacement of the valve member. The pressure valve also includes a pressure-relief piston mounted in the low-pressure space and biased away from the partition, the pressure-relief piston being adapted for cooperation with the valve member for displacing the latter under the action of the pressure supplied to relieve the high-pressure space, this last-mentioned pressure acting upon the end face of the pressure-relief piston, remote from the valve member, in which pressure valve, the pressure-relief piston has therethrough an axial bore receiving therein an auxiliary piston which acts as an intermediary in the cooperation between the pressure-relief piston and the valve member. The valve member having in the body thereof, adjacent to the low-pressure space, throttling passages communicating with the axial passages of the valve member, the throttling passages of the valve member having the flow passage area substantially short of the flow passage area of the axial passages of the valve member and being arranged so that, when the high-pressure space is to be relieved, the latter and the low-pressure space communicate via the throttling passages until the effort transmitted to the valve member by the auxiliary piston overcomes the pressure exerted upon the valve member from the high-pressure space.

This structure of the pressure valve provides in the course of the relieving action, e.g. pressure-relieving of a hydraulic prop, gradual two-stage reduction of the pressure down to a zero value, preventing the occurence of a hydraulic shock and oscillation of the valve member. The herein disclosed structure of the pressure valve combines simplicity of design with a high reliability of performance, as compared with the existing prior known structures, due to the throttling passages being recurrently flushed with the very working fluid, which precludes their clogging.

The incorporation of the disclosed pressure valve, e.g. in the hydraulic props of powered mine roof supports, enables prolonging the service life of the powered roof support and of its hydraulic circuitry.

It is expedient that in the pressure valve, in order to simplify its structure and to enhance reliability of the pressure-relieving action, the respective dimensions of the low-pressure space, of the pressure-relief and auxiliary pistons and of the valve member should be selected that with the pressure-relief piston moved into its extreme position of abutting against the partition under the action of the pressure supplied to relieve the high-pressure space, the high-pressure space and the low pressure space should communicate via the throttling passages of the valve member, to effect gradual reduction of the pressure in the high-pressure space.

This selection of the relative dimensions of the components of the pressure valve enables defining positively the moment of the commencing of the pressure reduction and to provide for the stability of the performance of the components of the valve at gradual reduction of the pressure in the high-pressure space. This further enhances reliability of the performance of the valve.

It is further expedient that the throttling passages of the valve member be defined by flats made in the cylindrical surface of the end portion of the valve member, adjacent to the low-pressure space, and by the internal surface of the bore in the partition, the flats being arranged to balance the efforts exerted upon the valve member by the pressure of the fluid, as the latter flows through these throttling passages.

The arrangement of the throttling passages in the described manner enhances still further the reliability of the performance of the valve member, prevents the latter's jamming and simplifies the manufacture of the valve member.

In one embodiment of the present invention the valve member is made integral with the auxiliary piston, which proves expedient in a number of practical applications.

BRIEF DESCRIPTION OF THE DRAWINGS

The present invention will be further described in connection with embodiments thereof, with reference being made to the accompanying drawings, wherein:

FIG. 3 is a perspective view of the valve member of the pressure valve embodying the invention;

FIG. 4 is a longitudinally sectional view of the pressure valve embodying the invention, showing the relative positions of the components of the valve at the initial moment of the relieving action;

FIG. 5 is a longitudinally sectional view of the pressure valve embodying the invention, showing the relative positions of the components of the valve at the final moment of the relieving action; and FIG. 6 is a longitudinally sectional view of the pressure valve embodying the invention, wherein the valve member is made integral with the auxiliary piston.

DESCRIPTION OF THE PREFERRED EMBODIMENTS

Figure 1:
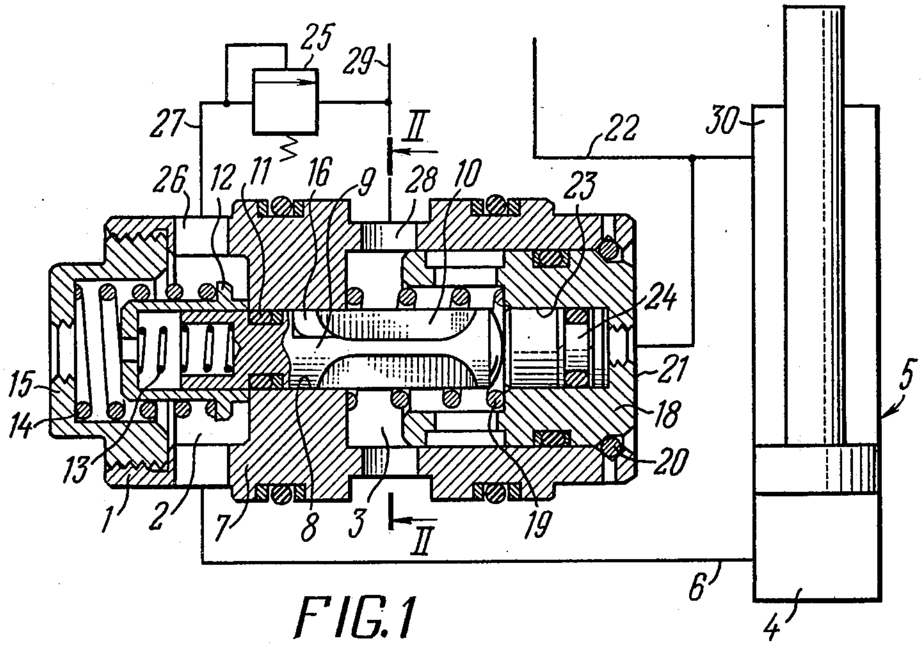
FIG. 1 is a longitudinally sectional view of a pressure valve embodying the invention, wherein the valve member and auxiliary piston are spearate components, the drawing schematically illustrating the connection of the pressure valve to a powered mine roof support as the latter is hydraulically compressed.

Following hereinbelow is a description of a practical embodiment of the pressure valve, also called a hydraulic lock, constructed in accordance with the invention and illustrated in FIG. 1.

The description refers to the pressure valve used for controlling the pressure in the hydraulically operated prop of a powered mine roof support, which, however, is not intended to narrow the essence and scope of the present invention.

The pressure valve has a housing 1 made of metal, wherein there are provided a high-pressure space 2 and a low-pressure space 3. The high-pressure space 2 is the space of the valve communicating with the under-piston space 4 of a hydraulic prop 5, e.g. via a line 6. The low-pressure space 3 is the space of the pressure valve, with a pressurized-fluid source (not shown).

The high- and low-pressure spaces 2 and 3, respectively, are separated from each other by a partition 7 wherein a through-going cylindrical bore 8 is made.

The bore 8 accommodates a reciprocable cylindrical valve member 9. In the body of the valve member 9 are longitudinal axial passages 10 (FIGS. 1 and 2). As it can be seen in FIG. 3, in this embodiment of the invention, the axial passages 10 are made in the form of diametrally opposing recesses in the body of the valve member 9. As seen in FIG. 2, the valve member 9 of this embodiment is cross-shaped in the zone of the passages 10. However, the number and the shape of the axial passages 10 do not constitute the subject-matter of the present invention and can be selected at random, without departing from the scope of the invention.

The diameter of the valve member 9 (FIG. 1) equals the diameter of the bore 8 in the partition 7. To provide fluid-tight separation between the high- and low-pressure spaces 2 and 3, respectively, the end portion of the valve member 9, adjacent to the high-pressure space 2, has an annular groove made therein, accommodating a seal 11. To protect the seal 11 from damage, the valve member 9 receives thereon a cap 12. The valve member 9 is spring loaded relative to the cap 12 by a compression spring 13, while another compression spring 14 urges the cap 12 relative to the housing 1, one end of the spring 14 abutting against the housing 1, and the opposite end thereof abutting against a shoulder of the cap 12. The spring 14 is intended to retain the cap 12 on the valve member 9, as the latter reciprocates, and also to return the valve member 9 into its initial position. The spring 13 is intended to retract the valve member 9 and its seal 11 from the cap 12 at the return stroke of the valve member 9.

To facilitate assembling of the components of the pressure valve, the housing is provided with a threaded lid 15 at the high-pressure space 2 side thereof.

The flow passage area of the axial passages 10 is selected to provide for rapid and reliable relieving of the under-piston space 4 of the hydraulic prop 5 from the pressurized liquid.

The length of the axial passages 10 is such that in the extreme position of the valve member 9, where it abuts jointly with the cup 12 against the lid 15, the high- and low-pressure spaces 2 and 3, respectively, communicate via the axial passages 10, which provides for rapid relieving of the pressure in the high-pressure space 2.

In accordance with the invention, in the body of the valve member 9 adjacent to the low-pressure space 3 are throttling passages 16 (FIG. 2). In the herein described practical embodiment of the invention, these throttling passages 16 are made externally of the body of the valve member 9 in the form of flats 17 (FIGS. 2 and 3). The throttling passages 16 per se are defined by the surface of the flats 17 and the internal surface or wall of the bore 8 (FIG. 1) of the partition 7, while the valve member 9 is within this bore 8. The flats 17 of the presently described embodiment are so arranged on the body of the valve member 9, that they balance the efforts exerted upon the valve member 9 by the pressure of the liquid flowing through these throttling passages 16 (FIG. 2). As seen in FIG. 2, the flats are arranged in diametral opposition to each other, to mutually counterbalance the unwanted biasing effort created by the pressure of the liquid flowing through the throttling passages 16. This feature precludes jamming of the valve member 9 in the bore 8 of the partition 7 and prolongs the service life of the valve member 9 and of the pressure valve unit, as a whole.

In the embodiment illustrated in FIG. 2, two flats 17 are made in the body of the valve member 17; however, other number of flats 17 may be selected. The actual number of flats depends on the total value of the flow passage area required of the throttling passages 16; however, the arrangement of the flats 17 is preferably such that the above-mentioned condition of balancing the efforts exerted by the pressure of the liquid should be satisfied.

Figure 2:
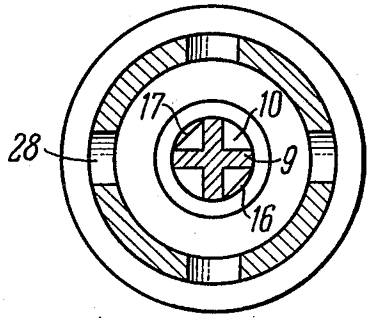
FIG. 2 is a cross-sectional view taken along the line II—II of FIG. 1.

Besides, in the presently described embodiment the flats 17 are arranged on the body of the valve member 9 so that the throttling passages 16 defined thereby present a continuation of the respective axial passages 10 (FIGS. 1 and 3).

The total flow passage area of the throttling passages 16 is substantially smaller than the total flow passage area of the axial passages 10, and it is selected so that at the initial stage of relieving the high-pressure space 2 from pressure, gradual and smooth reduction of the pressure in the high-pressure space 2 should be provided for by the pressurized liquid flowing via the throttling passages 16, and the unwanted oscillation of the valve member 9 should thus be precluded.

Mounted in the low-pressure space 3 is a pressure-relief piston 18 (FIG. 1) urged by a compression spring 19 away from the partition 7. The spring 19 serves for returning the pressure-relief piston 18 into its initial position.

To prevent escape of the pressure-relief piston 18 from the housing 1, the former is provided with stroke-limiting means in the form of a lock ring 20. The end face 21 of the pressure-relief piston 18, remote from the valve member 9, is open or exposed to be acted upon by the pressure relief-initiating pressure of the liquid fed via the line 22 connected to a pressurized-liquid source (not shown).

In accordance with a further feature of the present invention, an axial bore 23 is made through the pressure-relief piston 18.

This axial bore 23 accommodates an auxiliary piston 24. In the presently described embodiment of the invention the bore 23 is a steppd-diameter one, the larger diameter facing the interior of the low-pressure space 3, while the smaller diameter thereof faces outwardly of the low-pressure space 3 and is intended for the feed of the relief-initiating pressure from the line 22 to the auxiliary piston 24. However, this structure of the bore 23 is not mandatory, and the bore may be of a uniform diameter, in which case it is preferably provided with a lock ring to prevent the escape of the auxiliary piston 24 from this bore 23 of the pressure-relief valve 18.

The auxiliary piston 24 is arranged concentrically with the pressure-relief valve 18 and coaxially with the valve member 9 of which the adjacent end face it permanently engages. Both the pressure-relief piston 18 and the auxiliary piston 24 are provided with corresponding appropriate ring seals.

It should be pointed out that the axial length of the flats 17 is selected so that upon the relief-initiating pressure being fed via the line 22 to the end face 21 of the pressure-relief valve 18, the throttling passages 16 (FIG. 2) should establish communication between the high- and low-pressure spaces 2 and 3, respectively, until the effort applied to the valve member 9 (FIG. 1) by the auxiliary piston 24 under the action of the relief-initiating pressure thereupon overcomes the effort exterted by the pressure in the high-pressure space 2 upon the valve member 9. Furthermore, the dimensions of the low-pressure space 3, of the pressure-relief valve 18 and of the auxiliary one 24, and of the valve member 9 are so selected that with the pressure-relief piston 18 occupying its extreme position where it abuts against the partition 7 under the action of the relief-initiating pressure supplied via the line 22 to its end face 21, the high- and low-pressure spaces 2 and 3, respectively, should communicate via the throttling passages 16 (FIG. 2), to provide for smooth reduction of the pressure in the high-pressure space (2) (FIG. 1). The combination of the above features precludes the occurence of hydraulic shock and of oscillation of the valve member 9, which enhances the reliability of the performance of the pressure valve unit and prolongs its service life.

When the herein disclosed pressure valve is installed for controlling pressure in the hydraulic prop of a powered mine roof support, the pressure valve unit is accommodated in a structure (not shown) incorporating a safety valve 25 limiting the buildup of the pressure in the under-piston space 4 of the hydraulic prop 5.

In this embodiment, the high-pressure space 2 (FIG. 1) communicates via openings 26 in the housing 1 and via a line 27 with the safety valve 25, while via the line 6 it communicates with the under-piston space 4 of the hydraulic prop 5.

The low-pressure space 3 communicates via openings 28 in the housing 1 and a line 29 with a pressurized working liquid source (not shown).

In the presently described practical embodiment of the invention four such openings 26 are made in the housing 1 of the pressure valve unit to communicate the high-pressure space 2 with the safety valve 25 and with the hydraulic prop 5, and four such openings 28 are made in the housing 1 to communicate the low-pressure space with the pressurized liquid source (not shown). However, this number of the openings in the housing 1 of the pressure valve is not mandatory, and may be either greater or smaller.

The line 22 through which the working liquid is supplied from the source to act upon the end face 21 of the pressure-relief piston 18 also communicates with the above-piston space 30 of the hydraulic prop 5.

In the initial state of the operation, the components of the presently described pressure valve occupy the following positions.

The pressure-relief valve 18 is maintained by the action of the spring 19 in its position most remote from the partition 7. The valve member 9 acted upon by the springs 13 and 14 maintains the auxiliary piston 24 likewise in the latter's position which is the most remote from the partition 7. The valve member 9 occupies a position where its axial and throttling passages 10 and 16, respectively, open into the low-pressure space 3, while the seal 11 provides for a fluid-tight seal of the high-pressure space 2 from the low-pressure space 3.

With the pressure valve in the abovespecified state, the associated hydraulic prop 5 can be either in a loaded or in a relieved state.

Let us presume that in FIG. 1 the hydraulic prop 5 is in a relieved state.

When the hydraulic prop 5 is to be extended or loaded, the pressure valve operates, as follows. The working liquid is supplied from the source (not shown) via the line 29 and the openings 28 into the low-pressure space 3, the safety valve 25 preventing the access of the working liquid via the line 27 into the high-pressure space 2. The action of the pressure of the liquid, exerted upon the valve member 9, displaces the latter so that it compresses the springs 13 and 14, and moves in the direction of the high-pressure space 2. Upon the axial passages 10 opening into the high-pressure space 2, the intense filling up of the high-pressure space 2 with the working liquid commences, and the working liquid flows via the openings 26 and the line 2 into the under-piston space 4 of the hydraulic prop 5. The seal 11 of the valve member 9 now finds itself within the cap 12, which prevents its wear. The piston rod of the hydraulic prop is projected, and the working liquid is supplied into the under-piston space 4 until the required pressure is built up therein.

Upon the required pressure having been built up in the hydraulic prop 5, the supply of the pressurized working liquid into the low-pressure space 3 is terminated, whereby the valve member is returned by the combined action of the pressure of the liquid in the high-pressure space 2 and of the springs 13, 14 into its initial position where it seals the high-pressure space 2 from the low-pressure space 3.

The seal 11 thus reliably locks up the pressurized working liquid in the high-pressure space 2 and in the under-piston space 4 of the hydraulic prop 5.

To relieve the hydraulic prop 5 from the pressure, the following is done.

The working liquid is fed from the source via the line 22 under a pressure called the pressure relief-initiating one simultaneously into the above-piston space 30 of the hydraulic prop 5 and to act upon the end face 21 of the pressure-relief piston 18. The relief-initiating pressure value should be sufficient to develop an effort capable of overcoming the effort exerted upon the pressure-relief piston 18 by the combined action of the springs 13, 14, 19 and of the pressure of the liquid in the high-pressure space 2. Under the action of the relief-initiating pressure of the thus selected value, the pressure-relief piston 18 is displaced toward the partition 7, moving therealong the auxiliary piston 24 and the valve member 9. This displacement of the pressure-relief piston 18 continues until it abuts against the partition 7. At this position of the pressure-relief piston 18, the throttling passages 16 open into the high-pressure space 2, so that smooth outflow of the working liquid commences from the high-pressure space 2 into the low-pressure space 3 via the throttling passages 16, and therefrom via the openings 28 into the line 29 leading to a drain. Due to the throttling passages 16 having a relatively small total flow passage area, the reduction of the pressure in the high-pressure space 2 and in the under-piston space 4 of the hydraulic prop 5 takes place smoothly and gradually. Meanwhile, the valve member 9 is stationary, occupying the position shown in FIG. 4 of the drawings, while the auxiliary piston 24 is retained by the pressure thereupon exerted by the valve member 9 within the bore 23 of the pressure-relief piston 18. The piston rod of the hydraulic prop 5 (FIG. 1) is in the meantime practically stationary. In this way, the first stage of the relieving of the hydraulic prop 5 is effected.

This smooth reduction of the pressure in the high-pressure space 2 and the communication between the two spaces 2 and 3 via the throttling passages 16 continues until the pressure applied to the valve member 9 by the auxiliary piston 24 acted upon by the relief-initiating pressure overcomes the effort of the pressure acting upon the valve member 9 from the high-pressure space 2, in combination with the effort of the springs 13 and 14 also acting upon the valve member 9.

Thus, with the pressure within the high-pressure space 2 reduced to a predetermined sufficiently low value, the auxiliary piston 24 starts moving under the action thereupon of the pressure of the working liquid supplied via the line 22. This outward motion and this action of the pressure of the working liquid upon the auxiliary piston 24 have been made possible exclusively by the provision of the through-going bore 23 in the pressure-relief piston 18.

The outward displacement of the auxiliary piston 24 results in the simultaneous displacement of the valve member 9 toward the high-pressure space 2. This displacement of the valve member 9 results in that at a certain moment the axial passages 10 open into the high-pressure space 2, whereby there commences intensive outflow of the liquid via the axial passages and the line 29 which leads to a drain. The pressure in the space 2 and in the under-piston space 4 rapidly drops, and the piston rod of the hydraulic prop 5 is retracted. In this manner the second stage of the relieving of the hydraulic prop 5 is effected. At this stage the valve member 9 is in its extreme projected position illustrated in FIG. 5 of the drawings.

With the piston rod of the hydraulic prop 5 having been retracted into its desired position, the supply of the pressurized liquid into the line 22 (FIG. 1) is discontinued, whereby the auxiliary and pressure-relief pistons 24 and 18, respectively, are relieved from the action of this pressure thereupon. The action of the springs 13, 14 and 19 now returns the valve member 9, the auxiliary piston 24 and the pressure-relief piston 18 into their respective initial positions shown in FIG. 1.

The abovedescribed structure of the pressure valve, providing for conducting the relieving operation as if in two stages, with the smooth reduction of the high pressure during the first stage, enables to reduce significantly the dynamic loads acting upon all of the major components of the pressure valve, which enhances its reliability and prolongs its service life.

In a modification of the pressure valve illustrated in FIG. 6, the auxiliary piston 31 is made integral with the valve member 32. In this embodiment, the diameter of the auxiliary piston 31 has to be smaller than that of the valve member 32 proper. The rest of the components of the pressure valve unit are identical to those described hereinabove, and the operation of the pressure valve of this modification is similar to that described in connection with the embodiment illustrated in FIGS. 1 to 5.

A pressure valve of a structure embodying the present invention may be suitably employed in association with various designs of hydraulic props of various mine roof support systems, which, however, in no way precludes its efficient utilization in fluid-pressure systems of other industries.

Although the present invention has been described in some detail by way of illustration and example for purposes of clarity of understanding, it will, of course, be understood that various changes and modifications may be made in the form, details, and arrangements of the parts without departing from the scope of the invention as set forth in the following claims.

What is claimed is:

1. A pressure valve actuated by pressurized fluid supplied from a pressurized fluid source, comprising:

a housing having a high-pressure space and a low-pressure space separated by a partition in said housing;

openings in said housing for supplying said pressurized fluid into said spaces from said fluid source;

an axial bore in said partition, and a cylindrical valve member reciprocatingly supported in said axial bore;

axial passages in the body of said valve member for alternatingly establishing communication between said spaces upon displacement of said valve member;

a pressure-relief piston accommodated in said low-pressure space and biased away from said partition, said pressure-relief piston being movable in said low-pressure space under the action of said pressurized fluid supplied to initiate the pressure-relieving of said high-pressure space and acting upon the end face of said pressure-relief piston, remote from said valve member;

an axial bore in said pressure-relief piston;

an auxiliary piston accommodated in said axial bore of said pressure-relief piston and cooperating with said valve member for transmitting thereto the displacement of said pressure-relief piston under the action of the fluid pressure supplied to effect the pressure-relieving of said high-pressure space;

throttling passages in the body of said valve member adjacent to said low-pressure space and communicating with said axial passages of said valve member, said throttling passages of said valve member offering a flow passage area which is substantially smaller than that offered by said axial passages, said throttling passages being arranged to provide a first stage during the operation of pressure-relieving of said high-pressure space, said high-pressure space and said low-pressure space communicating via said throttling passages of said valve member until said pressure-relief piston abuts said partition and said pressurized fluid drives said auxiliary piston during a second stage to communicate said low pressure space with said high pressure space via said axial passages.

2. A pressure valve as set forth in claim 1, wherein said throttling passages are defined by flats on the cylindrical surface of the end portion of said valve member, adjacent to said low-pressure space, the surface of said flats defining said throttling passages jointly with the internal surface of said bore in siad partition, and said flats being arranged so as to balance the action exerted upon said valve member by the pressure of the fluid flowing through said throttling passages.

3. A pressure valve as set forth in claim 4, wherein said valve member is made integral with said auxiliary piston.

4. A pressure valve actuated by pressurized fluid supplied from a pressurized fluid source, comprising:

a housing having a high-pressure space and a low-pressure space separated by a partition in said housing;

openings in said housing for supplying said pressurized fluid into said spaces from said fluid source;

an axial bore in said partition; and a cylindrical valve member reciprocatingly supported in said axial bore;

axial passages in the body of said valve member for alternatingly establishing communication between said spaces upon displacement of said valve member;

a pressure-relief piston accommodated in said low-pressure space and biased away from said partition, said pressure-relief piston being movable in said low-pressure space under the action of said pressurized fluid supplied to initiate the pressure-relieving of said high-pressure space and acting upon the end face of said pressure-relief piston, remote from said valve member;

an axial bore in said pressure-relief piston;

an auxiliary piston accommodated in said axial bore of said pressure-relief piston and cooperating with said valve member for transmitting thereto the displacement of said pressure-relief piston under the action of the fluid pressure supplied to effect the pressure-relieving of said high-pressure space;

throttling passages in the body of said valve member adjacent to said low-pressure space and communicating with said axial passages of said valve member, said throttling passages of said valve member offering a flow passage area which is substantially smaller than that offered by said axial passages, said throttling passages being arranged to provide a first stage during the operation of pressure-relieving of said high-pressure space, said high-pressure space and said low-pressure space communicating via said throttling passages of said valve member until said pressure-relief piston abuts said partition and said pressurized fluid drives said auxiliary piston during a second stage to communicate said low pressure space with said high pressure space via said axial passages and wherein the dimensions of said low-pressure space, of said pressure-relief and auxiliary pistons and of said valve member are so selected that with said pressure-relief piston in its extreme position of abutting against said partition under the action thereupon of the fluid pressure supplied to initiate the pressure-relieving of said high-pressure space, said high-pressure space and said low-pressure space communicating with each other via said throttling passages of said valve member, thereby providing for a smooth reduction of the pressure in said high-pressure space.

5. A pressure valve as claimed in claim 4, wherein said throttling passages are defined by flats made in the cylindrical surface of the end portion of said valve member, adjacent to said low-pressure space, the surface of said flats defining said throttling passages jointly with the internal surface of said bore in said partition, and said flats being arranged so as to balance the action exerted upon said valve member by the pressure of the fluid flowing through said throttling passages.

* * * * *